Oct. 3, 1961 P. L. HUGHES ET AL 3,002,838
METHODS OF TREATING CITRUS FRUIT FOR THE PRODUCTION OF A HIGH PROTEIN STOCK FEED
Filed Feb. 27, 1958
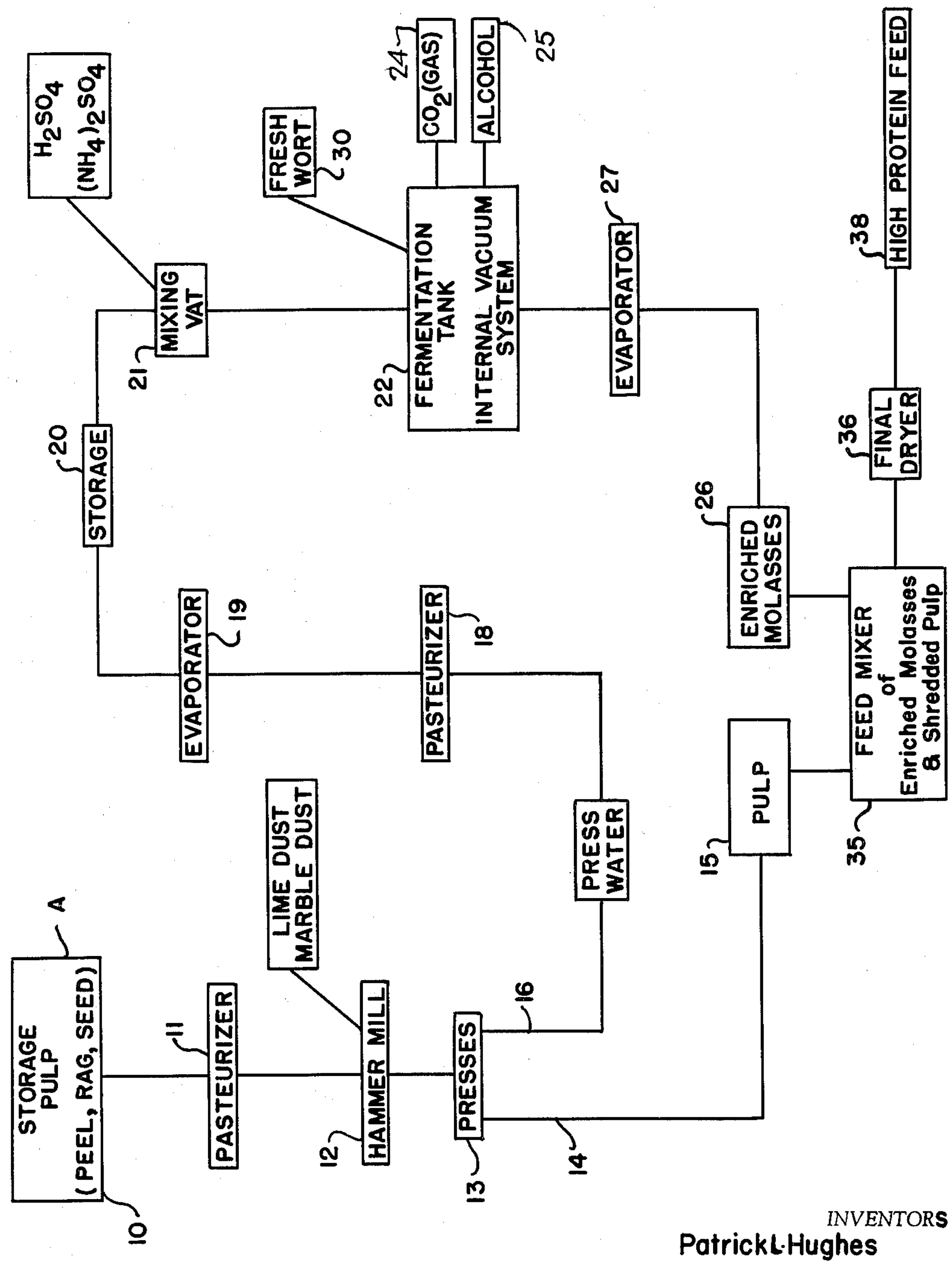
INVENTORS
Patrick L. Hughes
Jonathan B. McKay
BY Rommel, Allwine & Rommel
ATTORNEYS United States Patent Office 3,002,838

Patented Oct. 3, 1961

3,002,838

METHODS OF TREATING CITRUS FRUIT FOR THE PRODUCTION OF A HIGH PROTEIN STOCK FEED

Patrick L. Hughes, Lakeland, Fla., and Jonathan B. McKay, Bascom, Ohio, assignors to Gavin D. McKay, De Kalb, Ga.

Filed Feb. 27, 1958, Ser. No. 717,917
14 Claims. (Cl. 99—9)

This invention relates to a biochemical process for producing a feed with a protein content higher than that obtained by processes presently employed.

The primary object of this invention is the provision of an improved process for treating citrus products such as peels, rags, seeds and fruit, including initial separation of pulp and press water; the press water being treated in an improved fermentation step for economical increase of protein content and which water is then reduced to molasses and added to the pulp for ultimate production of a high protein stock feed.

A further object of this invention is the provision of improvements in the process of producing feed from such products as citrus fruits, sugar cane and the like, wherein an improved fermentation step is used for removal of carbon dioxide, alcohol, esters and aldehydes, under vacuum treatment, and at controlled temperatures which will enable the propagation of yeast cells under such circumstances as to provide a fermentation solution having a very high percentage of protein.

A further object of this invention is the provision of an improved process for the production of a high protein stock feed which preferably consists of the reduction of citrus products, such as peel, rag, seed and low grade citrus fruit, adding thereto an acid neutralizer; separating pulp from liquid, enriching the liquid in an improved fermentation step which includes the removal of yeast cell destroying material such as carbon dioxide and alcohol; continuing the fermentation step by the addition of fresh citrus wort under controlled conditions until the fermented liquid has reached a desired protein value; and evaporating the resultant liquid to produce an enriched molasses, and subsequently admixing the molasses and pulp to produce a stock feed of extremely high protein content.

Other objects and advantages of this invention will be apparent during the course of the following detailed description.

In the accompanying drawing forming a part of this specification, and wherein similar reference characters designate corresponding parts, the letter A may generally diagrammatically designate the step of the process. At 10, the citrus product, which may consist of peel, rag, seed and low grade citrus fruits is reduced to a condition suitable for use in the process. It is next treated in a pasteurizer 11, and then conveyed to a reducing or hammer mill 12, where it is pulverized. In the hammer mill 12, the product has added therewith an acid neutralizing material such as the conventionally used lime dust, or marble dust (calcium hydroxide) may be used, since it produces a more palatable end product. The amount of additive is sufficient to neutralize the citric acid and break down the cell structure of the pulp during the pulverizing step. The material goes from the hammer mill to the press stage 13, which may be any appropriate equipment, preferably rollers for extracting press water from pulp. From the presses the pulp passes via line 14, to a pulp storage vat 15, and the press water passes via line 16, to a pasteurizer 18.

The solid and liquid portions of the pulp thus obtained may vary. The material passing through the pasteurizer 18 contains fruit, sugar and minerals and preferably has a Brix scale reading of from 5 to 7. The pasteurizer treatment must be such as not to carmelize the sugar. The press water then passes through an evaporator where the solution is brought to a Brix scale reading of 19 to 20. The solution is then passed to a storage tank 20.

The solution, as needed, is withdrawn from storage tank 20, into a mixing vat 21, wherein sulphuric acid ($H_2SO_4$) is added in quantity sufficient to reduce acidity to 5.5 pH to 6.0 pH. In the mixing vat 21, or along the line of travel to the fermentation tank it is preferred to add to the solution some such mineral salts as ammonium sulphate, free nitrogen, sugar or other nutritious material capable of increasing yeast cell reproduction and growth during the fermentation process.

The solution then passes to a fermentation tank 22 having an internal vacuum system wherein the solution is permitted to ferment for a period of time sufficient to propagate yeast cells and give the desired protein percentage. The vacuum pan type fermentation tank is preferably under a high vacuum of 28 inches to 29 inches of mercury, and the solution therein is treated at a temperature ranging from 70 degrees F. to 110 degrees F., but preferably in the neighborhood of 78 degrees F.

From the fermentation tank, carbon dioxide ($CO_2$) gas is removed at 24 and 25 alcohols may be removed, as well as esters and aldehydes. These are removed in order to insure increase of protein mineral content of the solution. They are removed prior to completion of the fermentation process in tank 22 because they are yeast cell destroying. Some potassium salts are formed in the solution in the tank 22, and the solution after fermentation has a protein content of from 18% to 20%, by volume. The resultant solution after fermentation is passed through an evaporator 27, until the same has substantially a Brix scale reading of 70, and then passes in a molasses like state to tank 26.

During fermentation treatment in tank 22, fresh citrus wort is added from 30. This wort is from 2 to 4 hours old and is at the height of fermentation having a Brix scale reading of 19 to 20. It is citrus press water and preferably has a pH value of 5.5. As much fresh citrus wort may be added to the solution in the fermentation tank as desirable; usually 25% by volume being added to the material treated in the tank. Thus, if the process is operating with a press water capacity of 10,000 gallons, the fresh wort added from 30 will be 2500 gallons.

The fresh wort added to fermentation step from 30 has been pasteurized and brought to a Brix scale reading of 19 to 20, and has a pH value of 5.5. It also has ammonium sulphate added, and is usually kept in storage tanks to be used when needed.

The molasses at 26, after subjection to treatment at 27, has a protein value of 18% to 20% by volume.

To each one and one half (1½) gallons of molasses obtained there are obtained one gallon of 100 proof alcohol and one pound Dry Ice ($CO_2$).

The pulp and enriched molasses are passed from steps 15 and 26 into a feed mixer 35; the amount of pulp used being approximately 45% by volume and molasses approximately 55% by volume. In the feed mixer 35 cooking takes place at approximately 240 degrees F. to make the yeast available as feed. The mixed feed is then passed through a final dryer 36, wherein it is subjected to approximately 240 degrees F. The moisture content is therein reduced from 50%–70% by volume to approximately 4%–5% by volume. The feed is then passed to the removal stage 38, wherein it contains from 6% to 18% by volume of protein, and even higher, if the proper regulation is taken to insure such, during the fermentation treatment.

It should be noted that 100 pounds of pulp at storage 15 contains approximately 40 pounds solids and 60 pounds water; 100 pounds syrup at step 26 contains approximately seventy (70) pounds solids and thirty (30) pounds water. In the feed mixture if equal quantities by volume of pulp and molasses are used the same will contain substantially 50 pounds solids and 45 pounds water.

The resultant high protein pulp feed produced by the method herein described may be treated with ultra violet rays for production of ergosterol, a nutritious vitamin much desired in stock feed.

It is mainly because of yeast propagation that the product can thus be treated for ergosterol. Such treatment has not been found successful in the treatment of ordinary citrus pulp feeds now commercially used.

Various changes in the steps of the process herein described may be made to the form of invention, and various materials may be subjected to the treatment herein defined, without departing from the spirit of the invention or scope of the claims.

We claim:

1. The steps in the biochemical treatment of such products as citrus fruit, which consists in reducing and separating the product to a pulp constituent and pressed water constituent, subjecting the pressed water constituent to a fermentation treatment for increasing the protein value thereof, subsequently reducing the solution obtained from the fermentation steps to a molasses state, mixing suitable proportions of the pulp ingredient and molasses, drying the same and obtaining a resultant high protein stock feed.

2. A process for the production of a high protein content stock feed which consists in separating citrus pulp into two constituent parts, that is, pulp and press water, subjecting the press water to a fermentation vacuum treatment and during such treatment vacuum removing the alcohol and gas constituents from the fermentation step, continuing the fermentation treatment to produce a solution having a higher protein content, subjecting the solution to an evaporation treatment for reducing the same to a molasses state, mixing the molasses thus obtained with desired proportions of the pulp obtained by the separation treatment, and subsequently treating the mixture to obtain a resultant high protein content stock feed.

3. A process as described in claim 2, in which during the fermentation treatment fresh pressed water citrus wort is added to the solution being fermented.

4. A process as described in claim 3, in which the fresh pressed water citrus wort added to the solution during the fermentation treatment comprises substantially 25% by volume of the amount of solution being fermented.

5. In a biochemical process for increasing the nutritional value of stock feed the steps which consist in reducing citrus products and separating the constituent parts thereof into a pulp ingredient and a press water constituent, treating the press water for control of the pH value thereof, and subjecting the press water solution thus obtained to a fermentation vacuum type treatment, and during the fermentation treatment adding yeast cell growth producing ingredients thereto, removing from the solution during fermentation treatment yeast cell inhibiting ingredients, evaporating the solution after the fermentation step treatment to produce molasses, admixing desired proportions of the pulp obtained by the separation step as aforesaid with the molasses, and subsequently treating the admixed product for the production of a high protein content stock feed.

6. A process as described in claim 5, in which the citrus product prior to press treatment is subjected to treatment with additives selected from the group consisting of lime dust and calcium hydroxide, and in which just prior to the fermentation tank treatment the solution obtained from the press water is subjected to additive treatment of sulphuric acid and ammonium sulphate.

7. The process as defined in claim 6, in which during the fermentation treatment there is added to the fermenting solution citrus press water wort in amount sufficient to substantially increase the protein value of the fermented solution to the desired extent.

8. A process for the production of a high protein content stock feed which consists in reducing citrus fruit materials; subjecting the mass to separation treatment to obtain pulp and pressed citrus water, subjecting the pressed citrus water to an evaporation treatment for bringing the solution to a Brix scale reading of substantially 19 to 20, reducing the acidity of the citrus water thus obtained and thereafter subjecting said citrus water to a fermentation treatment under vacuum and at the same time subjecting the citrus water to temperature treatment ranging from 70° F. to 110° F., removing from the citrus water during the fermentation treatment carbon dioxide gas and alcohols, esters and aldehydes; subsequently subjecting the citrus water to an evaporation treatment until the resultant mass is in a molasses like state, mixing the pulp portion of the product with the resultant molasses like product in suitable proportions and subjecting the same to a cooking temperature and finally drying the resultant mass to reduce the moisture content from 50% to 75% by volume to obtain citrus stock feed.

9. The process described in claim 8 in which fresh citrus wort is added to the citrus water during the fermentation treatment, having controlled Brix scale reading and pH value for enhancing fermentation.

10. A method of treating citrus fruit products for the production of a high protein stock feed which consists in the initial treatment of the citrus fruit products to obtain a citrus pulp and press citrus water, subjecting the citrus press water to a fermentation stage treatment induced by the addition of a desired quantity of yeast culture and the addition thereto of nutrient salts or nitrogenous extracts with a rapid removal from the fermentation treatment of alcohols and carbon dioxide for the purpose of promoting years growth, subsequently reducing the solution from the fermentation treatment to a molasses like state and then mixing the molasses in desired proportion with the citrus pulp to obtain a high protein stock feed.

11. The steps in the bio-chemical treatment of citrus fruit materials which consists of reducing and separating materials to a pulp constituent and a press water solution, evaporating a portion of the press water solution, mixing with the remaining press water solution materials capable of increasing yeast cell reproduction and growth selected from a group consisting of mineral salts such as ammonium sulphate, free nitrogen and sugar, fermenting the solution while under partial vacuum for removal of gaseous carbon dioxide and alcohols, and subsequent to the fermentation treatment subjecting the materials to an evaporation treatment to produce an enriched molasses residue, admixing pulp with the enriched molasses residue, and finally drying the mixture thus obtained to obtain a high protein feed.

12. The process of claim 11 in which during fermentation treatment fresh citrus wort is added to the materials being fermented in a percentage substantially less than the original fermenting solution.

13. The steps in the bio-chemical treatment of citrus fruit materials such as citrus fruit, peels, rag, and seeds which consists in reducing and separating the materials to a pulp constituent and a press water constituent, pasteurizing and evaporating a portion of the press water constituent to bring the resultant solution to a Brix scale reading of substantially 19 to 20, passing the solution in a mixing vat and there subjecting it to acidity reducing materials, adding to the solution nutritious materials capable of increasing yeast cell reproduction and growth during fermentation, and then subsequently subjecting the solution to a fermentation under internal vacuum for removing carbon dioxide, alcohols, esters and aldehydes, the fermentation being carried out until the fermented solution has reached a protein content of from 18% to 20% by volume, subsequently evaporating the thus obtained solution to substantially a Brix scale reading of 70 and is in a molasses state, subsequently mixing the molasses thus obtained with the aforementioned pulp constituent in substantially the proportions of 45% volume of pulp to 55% volume of molasses, the mixing being carried out under cooking temperatures, and subjecting the admixed product to a final drying operation for a reduction of the moisture content of from 50% to 70% by volume to provide a high protein feed containing from 6% to 18% by volume protein.

14. The process of claim 13 in which during the fermentation treatment fresh citrus wort is added to the solution being fermented in substantially 25% by volume to the volume of the solution being fermented.

References Cited in the file of this patent

UNITED STATES PATENTS

| | | |
|---|---|---|
| 2,724,648 | Burdick | Nov. 22, 1955 |
| 2,809,113 | Stimpson et al. | Oct. 8, 1957 |

FOREIGN PATENTS

| | | |
|---|---|---|
| 1,090,608 | France | 1955 |

UNITED STATES PATENT OFFICE
CERTIFICATION OF CORRECTION

Patent No. 3,002,838 October 3, 1961

Patrick L. Hughes et al.

It is hereby certified that error appears in the above numbered patent requiring correction and that the said Letters Patent should read as corrected below.

In the grant, line 3, address of assignee, for "De Kalb, Georgia," read -- De Kalb County, Georgia, --; in the heading to the printed specification, line 7, for "De Kalb, Ga." read -- De Kalb County, Ga. --; column 2, line 24, after "and" insert -- at --; column 3, line 75, after "solution" insert -- fresh --; column 4, line 36, for "years" read -- yeast --.

Signed and sealed this 3rd day of April 1962.

(SEAL)
Attest:

ERNEST W. SWIDER
Attesting Officer

DAVID L. LADD
Commissioner of Patents